July 15, 1969  T. L. WOLF  3,454,971
HOLD-DOWN FIXTURE
Filed July 13, 1966  2 Sheets-Sheet 1

INVENTOR.
T. L. WOLF
BY
Robb Robb
attorneys

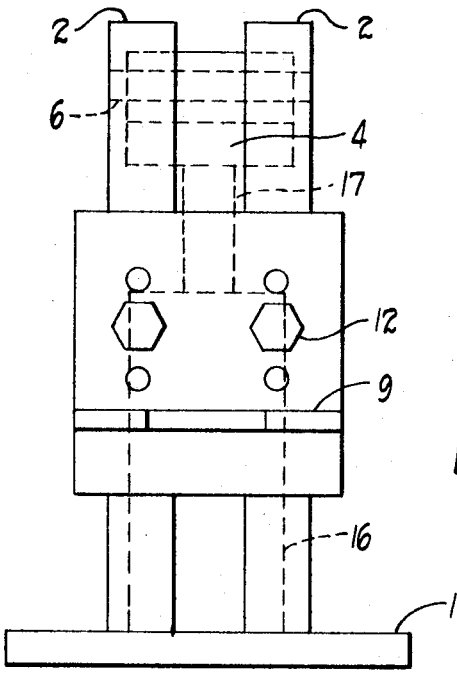
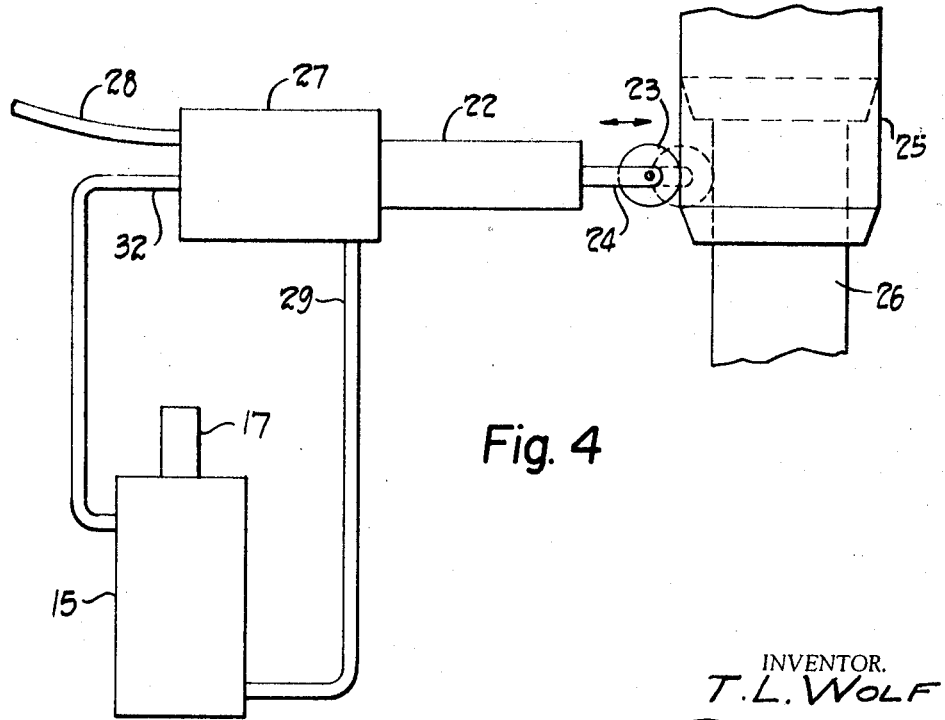

United States Patent Office 3,454,971
Patented July 15, 1969

3,454,971
HOLD-DOWN FIXTURE
Theodore L. Wolf, Eastlake, Ohio, assignor to Jos. Dyson & Sons, Inc., Painesville, Ohio, a corporation of Ohio
Filed July 13, 1966, Ser. No. 564,854
Int. Cl. B23g 3/00; B23q 3/06
U.S. Cl. 10—107        2 Claims

ABSTRACT OF THE DISCLOSURE

The disclosure herein relates to a clamping fixture, hydraulically operated, in which a vertical piston and cylinder unit is connected to an operating arm extending at an angle thereto, which operating arm includes at its full extremity, the arm being L-shaped in inverted manner, an offstanding hold-down member which is adapted to be pivotally raised and lowered from the supporting columns to permit the emplacement of a work piece in a fixture and remove the same when machining or the like has been performed thereon, the pivoting action of the clamping arrangement being such as to facilitate access to the work piece.

---

This invention relates to hold-down fixtures and more particularly to a fixture which is most suitable for use in a tapping machine for tapping large nuts or similar articles.

One of the particular problems in a hold-down fixture of the nature herein under consideration, is to construct the same simply and to cause it to perform reliably, relying upon the actual motion of the spindle of the tapping machine or the like to initiate the operation of the hold-down for maintaining the nut in position while the tap is performing its tapping operation, to simply release the nut or similar article subsequent such tapping operation, and to provide for some considerable variation in size as well as location of the article to be tapped or have a similar work operation performed thereon.

This invention is to provide a hold-down fixture or the like, which may be constructed of simple components, provide for the motion of a hold-down member in such a manner as to permit the positioning of a work piece to be held down and by movement of certain of the machining instrumentalities themselves, effect operation so that the holding and positioning is performed in response to movement of a machine part.

Another object of the invention is to provide a hold-down fixture which is of simple construction, and is susceptible of adjustment over a substantial range, with movement of the hold-down part effected in response to control means which likewise may be adjustable.

Other and further objects of the invention will be understood from a consideration of the specification appended hereto and disclosed in the drawings wherein:

FIGURE 3 is a front view of the fixture.

FIGURE 4 is a diagrammatic view indicating a suitable arrangement of various parts for actuation and indicating further the method of initiating the operation of such parts.

Figures 1, 2:
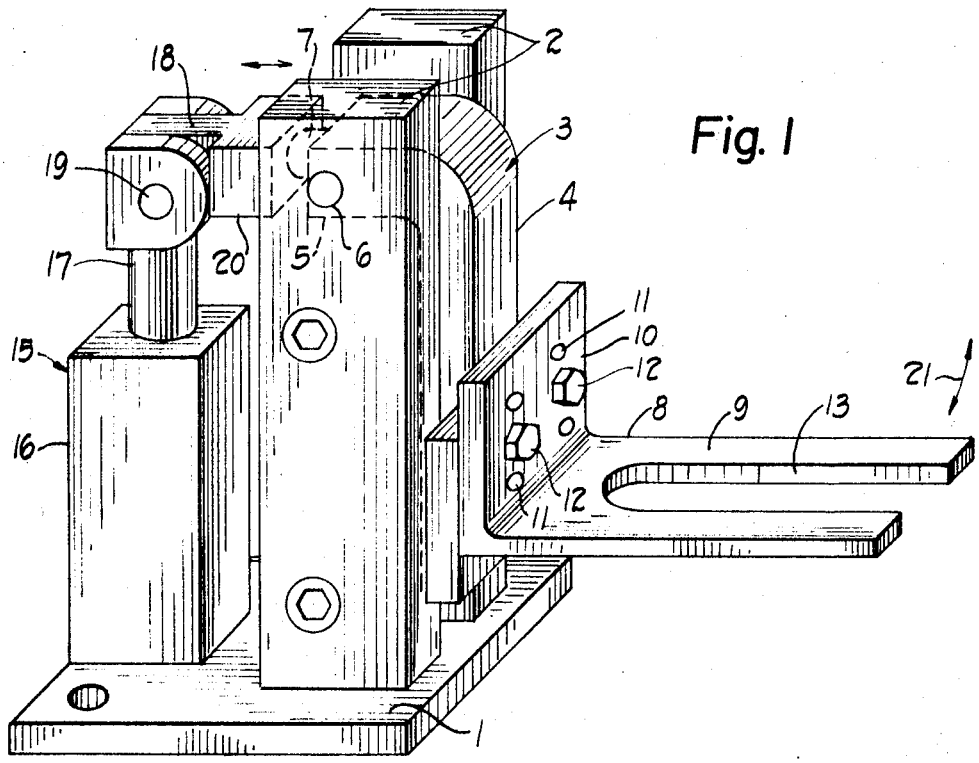
FIGURE 1 is a perspective view showing the hold-down fixture itself and illustrative of the relationship of the various parts thereof.
FIGURE 2 is a side elevational view of the fixture of FIGURE 1.

Referring now to FIGURE 1 the fixture hereof is shown as comprising a base 1 of any preferred configuration, in this case indicated as being of generally rectangular outline, and having extending upwardly therefrom a pair of parallel columns 2, said columns being spaced sufficiently to permit the support therebetween of supporting means generally denoted 3 which comprises an arm 4 extending downwardly, and offstanding from the upper end thereof a portion 5 in which is located a pivot 6 which in turn engages the upper ends of the columns 2.

The portion 5 has extending rearwardly therefrom as viewed in FIGURES 1 and 2, a pin 7 which is of round configuration and of suitable size for the purpose as will be understood hereinafter.

At the lower end of the arm 4, is located a hold-down member 8 which consists of an L-shaped part having the offstanding part 9 which acts as a clamping part and the vertically extending part 10 which latter includes a series of openings 11 therein by which the member 8 may be adjustably connected to the operating arm 4 in various vertical positions for example as by means of the bolts such as 12 is provided.

The part 9 of the member 8 may include preferably an open central portion such as 13 which will permit the movement of a tool downwardly therethrough and likewise facilitate movement of the member 8 in a manner to be subsequently set forth.

In order to move the operating arm 4 in a pivotal direction such as is indicated in dotted lines in FIGURE 2, for example, there is provided a cylinder and piston unit 15 including a cylinder 16 and having a piston therein at the upper end of which and extending outwardly therefrom is a rod 17.

The rod 17 is in turn pivotally connected to a connecting arm 18 which latter pivots on the pivot 19 and includes a portion 20 in which a suitable cylindrical opening is provided and which opening is in turn adapted to slidably receive therewithin the pin 7 previously referred to.

The basic concept as indicated in describing the various parts, is to facilitate the translation of vertical reciprocating movement into pivotal movement, the reciprocating movement being effected by the piston and cylinder unit 15 and to in turn provide for movement of the member 8 by the operating arm 4 in the direction indicated by the arrow 21.

The piston and cylinder unit 15 is intended to be operated as indicated by the diagrammatic showing of FIGURE 4, by means of a micro-switch member 22 which has extending from the outer end thereof the wheel 23 to operate the switch rod 24, which wheel 23 is in turn adapted to engage a spindle such as 25, of the tapping machine which is not shown in detail but which will readily be provided by those skilled in the art.

The spindle 25 may have for example, the step down portion 26 thereon so that when the spindle moves downwardly the wheel 23 will move from the dotted line position shown in FIGURE 4 to the full line position shown therein by reason of the change in diameter of the respective parts 25 and 26 so that the microswitch 22 is actuated.

The micro-switch 22 will in turn operate a conventional two-way valve 27 which controls the flow of air directed thereinto from a suitable source of air as 28, and through a line 29 to actuate the piston and cylinder unit 15 in such a manner that the piston rod 17 thereof is moved upwardly and thereby causes a downward pivotal action of the operating arm 4. The clamp portion 9 of the member 8 will thereby move into engagement with a workpiece such as indicated at 30 in FIGURE 2.

Conversely, operation of the spindle 25 upwardly will permit the wheel 23 to move from the solid line position into the dotted line position, disconnecting air from the line 29 and directing said air to the line 32, this in turn directing air to the upper end of the piston and cylinder unit 15, to thereby cause the piston rod 17 therein to be retracted or moved downwardly at the same time moving the arm 4 pivotally in such a manner that the member 8 is moved out of position in contact with the nut 30 for example.

It will be observed that since the operating arm 4 is moved so as to move the clamp or hold-down member 8 out of a position above the nut 30, that the nut may be removed, and a second work piece substituted therefor and the operation previously described repeated so as to effect tapping.

It will be understood that a suitable supporting or chuck member such as 35 may be provided which will make possible the locating of a nut such as 30 therein for the tapping operation to be performed thereon.

It is understood that other operations may be performed by a machine in which this hold-down fixture is positioned, but the tapping operation illustrated, is materially expedited in point of production by the fixture hereof, which translates the reciprocating motion into a pivotal motion and thus enables the positioning of and removal of a nut or the like from a suitable chuck member for an operation to be performed thereon by a tool or the like.

It is noted that the hold-down member 8 is positively maintained in position until release is effected so that if desired the tapping operation may be performed by a loose tap or by a fixed tap passing into the nut and removed therefrom by reverse rotation of the spindle or the like.

I claim:
1. In part holding fixture mechanism of the class described, in combination, operating member supporting means comprising vertical columns, an operating arm pivotally connected at the upper end of said columns, a hold-down member extending from said arm at the lower end thereof, said arm being adapted to move said member pivotally toward and from a chuck member in which a work piece is positioned, and actuating means extending along the columns and including cylinder and piston means, a piston rod extending upwardly from said means, a connecting arm extends from said rod and engages a pin extending from the upper end of the supporting arm, to facilitate relative sliding movement therebetween, upward and downward movement of said rod and connecting rod effecting pivotal movement of said supporting arm to raise and lower said hold-down member toward and from a work piece.

2. The combination as claimed in claim 1, wherein the hold-down member is adjustable relative the supporting arm.

References Cited
UNITED STATES PATENTS 2,561,819   7/1951   Porter et al. _____ 77—32.2

FOREIGN PATENTS 122,463   10/1946   Australia.

FRANCIS S. HUSAR, Primary Examiner

U.S. Cl. X.R.

10—129; 77—63; 269—32